United States Patent Office 2,936,304
Patented May 10, 1960

2,936,304
METALLIFEROUS AZO DYESTUFFS

Reinhard Neier, Basel, and Walter Wehrli, Riehen, near Basel, Switzerland, assignors to Sandoz A.G., Basel, Switzerland No Drawing. Application December 17, 1956
Serial No. 628,554

Claims priority, application Switzerland
December 23, 1955

3 Claims. (Cl. 260—151)

The present invention relates to a group of metalliferous azo dyestuffs which correspond to the formula

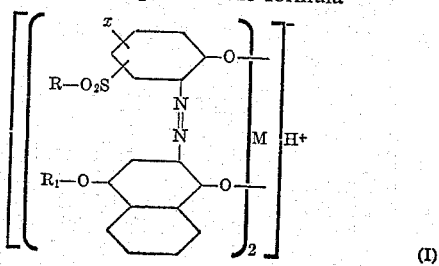

wherein $x$ denotes a hydrogen atom, a chlorine atom or a methyl group,
R denotes a lower alkyl radical, an amino group, a lower alkylamino group, a lower hydroxyalkylamino group, a lower alkoxyalkylamino group, a mononuclear arylamino group or a morpholyl group,
$R_1$ denotes a lower alkyl radical or a lower alkoxyalkyl radical, and
M denotes an atom of chromium or cobalt.

The process for the production of the new metalliferous azo dyestuffs consists in coupling 1 mol of the diazo compound of a 2-amino-1-hydroxybenzene of the general formula

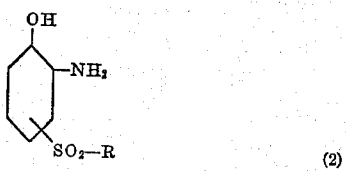

wherein R has the aforenamed significance and the benzene nucleus may contain further non-ionic substituents commonly present in azo dyestuffs, with 1 mol of a 1-hydroxy-4-alkoxynaphthalene whose alkyl radical may contain such non-ionic substituents as commonly found in azo dyestuffs, and treating the resulting monoazo compound with a metal yielding agent, preferably chromium or cobalt yielding agent, in such a way that a metal-containing dyestuff is produced which contains essentially one metal atom in complex combination with two molecules of the monoazo compound.

The coupling of the diazotized 2-amino-1-hydroxybenzenes of general Formula 2 with the 1-hydroxy-4-alkoxy-naphthalenes conforming to the present definition is best conducted in a weakly alkaline to alkaline medium and preferably in the presence of pyridine. The monoazo compounds thus formed are precipitated from the coupling mass by means of salt and subsequently filtered off.

Examples of diazo components particularly suitable for the present process are 2-amino-1-hydroxy-4-methylsulfonylbenzene, 2-amino-1-hydroxybenzene-4- or -5-sulfonic acid amide, 2-amino-1-hydroxy-6-chlorobenzene-4-sulfonic acid amide, 2-amino-1-hydroxy-6-methylbenzene-4-sulfonic acid amide, 2-amino-1-hydroxy-4-chlorobenzene-5- or -6-sulfonic acid amide and 2-amino-1-hydroxy-4-methylbenzene-5- or -6-sulfonic acid amide. The 2-amino-1-hydroxybenzene sulfonic acid amides may be further substituted on the nitrogen atom of the sulfonic acid amide group, preferably by alkyl, hydroxyalkyl, alkoxyalkyl, cycloalkyl, aralkyl and/or aryl radicals. Preferred representatives of such 2-amino-1-hydroxybenzene sulfonic acid amides are 2-amino-1-hydroxybenzene-4- or -5-sulfonic acid methylamide, ethylamide, -(2'-hydroxy)-ethylamide, -(2'-hydroxy)-propylamide, -(3'-methoxy)-propylamide and 2-amino-1-hydroxybenzene-4- or -5-sulfonic acid-di-[(2'-hydroxy)-ethyl]-amide. In the dialkylated sulfonic acid amide groups two alkyl groups may be combined with each other by a simple carbon linkage or cyclically through an oxygen atom. Representatives of this class of compounds are the 2-amino-1-hydroxybenzene-4- or -5-sulfonic acid pyrrolidides and morpholides.

As azo components 1-hydroxy-4-methoxynaphthalene and 1-hydroxy-4-ethoxynaphthalene are of primary importance.

The conversion of the monoazo compounds into their metal complexes is effected preferably with chromium or cobalt compounds. Metallization is carried out to advantage in aqueous solution or in an organic medium, for example formamide, or in the concentrated aqueous solution of an alkali-metal salt of a low molecular aliphatic monocarboxylic acid. It is advantageous to proportion the amount of metal-yielding agent so that less than two but at least one atom of metal acts upon two molecules of the monoazo compound.

Suitable chromium compounds are e.g. chromic fluoride, chromic sulfate, chromic formate, chromic acetate, potassium chromic sulfate and ammonium chromic sulfate. The chromates also, for example sodium or potassium chromate or bichromate, are very suitable for metallizing the monoazo compounds. When the latter are chosen it is of advantage to work in a strongly caustic alkaline medium with additions of reducing substances if desired.

Examples of suitable cobalt compounds are cobaltous formate, cobaltous acetate and cobaltous sulfate. If metallization is carried out in the concentrated aqueous solution of an alkaline salt of a low molecular aliphatic monocarboxylic acid, water-insoluble metal compounds, for example cobalt hydroxide or cobalt carbonate, may also be employed.

It is particularly advantageous to conduct the metallization in an aqueous or alkaline medium with the metal compounds added in the presence of compounds which maintain the metals dissolved in complex combination in a caustic alkaline medium, e.g. tartaric, citric or lactic acid.

The metal-complex compounds thus obtained are precipitated from aqueous medium by the addition of salt, the organic metallizing solution being previously run into water if desired. The precipitate is filtered off, washed if necessary, and finally dried.

The new metalliferous azo dyestuffs conforming to the present definition are metal-complex compounds containing essentially 1 atom of metal in combination with 2 molecules of a monoazo compound. The metal complex compounds are so-called 1:2 complexes in which 1 molecule of the monoazo compound is joined to approximately 0.3 to 0.7 of an atom of metal. The new dyestuffs dye wool, silk, leather and synthetic polyamide fibers from neutral or weakly acid baths in blue shades which are fast to light, washing, milling and perspiration. They are also suitable for dyeing man-made fibers which are subsequently spun from organic solvents and for pigmenting lacquers and plastics of every description.

The following examples illustrate the invention. All parts and percentages specified therein are by weight; the temperatures are given in degrees centigrade.

EXAMPLE 1

22.3 parts of 2-amino-1-hydroxy-4-chlorobenzene-5-sulfonic acid amide are diazotized with 6.9 parts of sodium nitrite in an ice-cooled solution of 17 parts of hydrochloric acid 30% and 100 parts of water The diazo solution at 0–5° is then run into a solution of 17.4 parts of 1-hydroxy-4-methoxynaphthalene, 8 parts of sodium hydroxide and 150 parts of water. As soon as formation of the monoazo compound is complete, it is precipitated from the coupling mass with sodium chloride, filtered and dried.

For converting into the cobalt complex compound, 20.4 parts of the monoazo compound are dissolved with 3 parts of sodium hydroxide in 400 parts of water at 60° C. A mixture of 7.1 parts of crystallized cobaltous sulfate, 2.8 parts of sodium hydroxide and 63 parts of a 3% aqueous solution of tartaric acid are added to the solution. After the mass has been stirred for half an hour the cobaltiferous azo dyestuff so formed is precipitated with sodium chloride, filtered off, dried and ground. It is a dark powder which dyes wool, silk, leather and synthetic polyamide fibers from a neutral to weakly acid dyebath in blue shades.

The dyeing procedure is as follows:

1 part of Glauber's salt and 0.2 part of the cobaltiferous azo dyestuff obtained according to the present example are dissolved in 500 parts of water. 10 parts of pre-wetted wool are entered into the dye-bath at 30°, which is then heated to 100° in 15 minutes and maintained at this temperature for 60 minutes. During the dyeing process 0.2 part of concentrated acetic acid is gradually added to the dyebath. On completion of dyeing the bright blue wool dyeing is rinsed with water and dried. Synthetic polyamide fibers are dyed on similar lines. Silk is dyed at a somewhat lower temperature, e.g 95°.

EXAMPLE 2

20.4 parts of the metal-free monoazo compound obtainable according to Example 1 are converted into the chromium complex compound by heating with 14 parts of potassium chromic sulfate in 100 parts of formamide at 100° until metallization is completed. The chromium complex compound is precipitated by diluting the mass with 200 parts of a concentrated sodium chloride solution and is then filtered off. The filter cake is dissolved by stirring in a dilute aqueous sodium hydroxide solution. The dyestuff is again precipitated from the solution by the addition of sodium chloride, filtered off and dried. The purified chromiferous azo dyestuff is a dark powder which dyes wool, silk, leather and synthetic polyamide fibers in greenish blue shades.

EXAMPLE 3

20.2 parts of 2-amino-1-hydroxybenzene-5-sulfonic acid methylamide are diazotized with 6.9 parts of sodium nitrite in 17 parts of hydrochloric acid 30% and 100 parts of water with ice added for cooling. The diazo solution at 0–5° is poured into a solution of 17.4 parts of 1-hydroxy-4-methoxynaphthalene, 6 parts of sodium hydroxide, 4 parts of sodium carbonate and 150 parts of water. As soon as formation of the monoazo compound is complete, it is precipitated from the coupling mass with sodium chloride, then filtered off and dried.

For converting into the chromium complex compound 19.4 parts of the monoazo compound are stirred into 400 parts of water. The suspension is given 125 parts of an aqueous solution of sodium 2-hydroxy-benzoate containing 1.5 parts of chromium in complex combination, and the whole is boiled with reflux until chromation is completed. The chromiferous azo dyestuff is precipitated from the metallizing mass by an addition of sodium chloride, dried and ground. It is a dark powder which dyes wool, silk, leather and synthetic polyamide fibers in greenish blue shades.

EXAMPLE 4

26.4 parts of 2-amino-1-hydroxybenzene-5-sulfonic acid phenylamide are diazotized with 6.9 parts of sodium nitrite in 20 parts of hydrochloric acid 30% and 200 parts of water with ice added for cooling. The diazo suspension at 0–5° is poured into a solution of 17.4 parts of 1-hydroxy-4-methoxynaphthalene, 8 parts of sodium hydroxide, 150 parts of water and 50 parts of pyridine. As soon as the formation of the monoazo compound is completed it is precipitated from the coupling mass with sodium chloride, then filtered off and dried.

In order to convert the monoazo compound into the chromium complex compound 22.5 parts of it with 4 parts of sodium hydroxide are dissolved in 700 parts of water. After the addition of 4.5 parts of sodium bichromate and 6.5 parts of glucose the mass is boiled with reflux until the metal-free monoazo compound is no longer indicated. The chromiferous monoazo compound thus formed is precipitated from the metallizing solution by the addition of sodium chloride and is then filtered off, dried and ground. It is a dark powder which dyes wool, silk, leather and synthetic polyamide fibers from a neutral to weakly acid bath in greenish blue shades.

In the following table further examples are enumerated whose method of production corresponds to those of the preceding examples. The resultant metalliferous azo dyestuffs are characterized by their diazo and azo components (columns (II) and (III)), the metal (column (IV)) and the shade of the dyeings obtained with them on wool (column (V)).

Table

| Example No. | (II) | (III) | (IV) | (V) |
|---|---|---|---|---|
| 5 | 2-amino-1-hydroxybenzene-4-sulfonic acid amide. | 1-hydroxy-4-methoxynaphthalene | Cr<br>Co | blue-gray.<br>violet-gray. |
| 6 | 2-amino-1-hydroxybenzene-4-sulfonic acid methylamide. | do | Cr<br>Co | blue-gray.<br>violet-gray. |
| 7 | 2-amino-1-hydroxybenzene-4-sulfonic acid-(2'-hydroxy)-propylamide. | do | Cr<br>Co | blue-gray.<br>violet-gray. |
| 8 | 2-amino-1-hydroxybenzene-5-sulfonic acid-(3'-methoxy)-propylamide. | do | Cr<br>Co | green-blue.<br>blue. |
| 9 | 2-amino-1-hydroxy-4-chlorobenzene-5-sulfonic acid methylamide. | do | Cr<br>Co | green-blue.<br>blue. |
| 10 | 2-amino-1-hydroxybenzene-5-sulfonic acid-(2'-hydroxy)-ethylamide. | do | Cr<br>Co | green-blue.<br>blue. |
| 11 | 2-amino-1-hydroxy-4-chlorobenzene-5-sulfonic acid amide. | 1-hydroxy-4-ethoxynaphthalene | Cr<br>Co | green-blue.<br>blue. |
| 12 | do | 1-hydroxy-4-n-propoxynaphthalene | Cr<br>Co | green-blue.<br>blue. |
| 13 | do | 1-hydroxy-4-(2'-methyl)-propoxynaphthalene. | Cr<br>Co | green-blue.<br>blue. |
| 14 | do | 1-hydroxy-4-(2'-ethoxy)-ethoxynaphthalene. | Cr<br>Co | green-blue.<br>blue. |

Table—Continued

| Example No. | (II) | (III) | (IV) | (V) |
|---|---|---|---|---|
| 15 | 2-amino-1-hydroxy-4-methylsulfonylbenzene. | 1-hydroxy-4-methoxynaphthalene | Cr / Co | blue-gray. / violet-gray. |
| 16 | ...do... | 1-hydroxy-4-ethoxynaphthalene | Cr / Co | blue-gray. / violet-gray. |
| 17 | 2-amino-1-hydroxy-4-chlorobenzene-5-sulfonic acid-(2'-hydroxy)-propylamide. | 1-hydroxy-4-methoxynaphthalene | Co | blue. |
| 18 | 2-amino-1-hydroxy-4-chlorobenzene-5-sulfonic acid-(2'-hydroxy)-ethylamide. | ...do... | Co | blue. |
| 19 | 2-amino-1-hydroxy-4-methylbenzene-5-sulfonic acid amide. | ...do... | Co | blue. |
| 20 | 2-amino-1-hydroxybenzene-4-sulfonic acid-ethylamide. | ...do... | Cr / Co | blue-gray. / violet-gray. |
| 21 | 2-amino-1-hydroxybenzene-5-sulfonic acid-isopropylamide. | ...do... | Cr / Co | green-blue. / blue. |
| 22 | 2-amino-1-hydroxybenzene-5-sulfonic acid-(2'-methyl)-phenylamide. | ...do... | Cr / Co | green-blue. / blue. |
| 23 | 2-amino-1-hydroxybenzene-4-sulfonic acid-(4'-chloro)-phenylamide. | ...do... | Cr / Co | blue-gray. / violet-gray. |
| 24 | 2-amino-1-hydroxybenzene-5-sulfonic acid-(4'-methoxy)-phenylamide. | ...do... | Cr / Co | green-blue. / blue. |
| 25 | 2-amino-1-hydroxybenzene-5-sulfonic acid dimethylamide. | ...do... | Cr / Co | green-blue. / blue. |
| 26 | 2-amino-1-hydroxybenzene-5-sulfonic acid-morpholide. | ...do... | Cr / Co | green-blue. / blue. |

Formulae of representative dyestuffs of the foregoing examples are as follows:

EXAMPLE 1

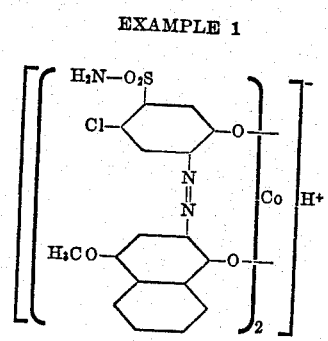

EXAMPLE 2

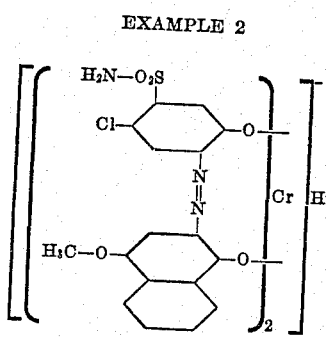

EXAMPLE 3

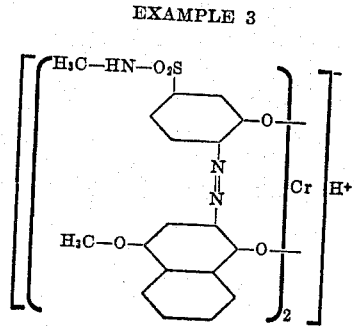

EXAMPLE 4

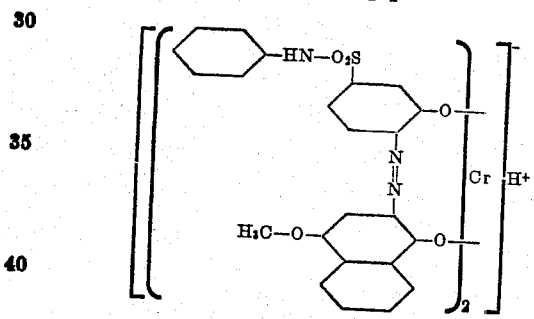

EXAMPLE 18

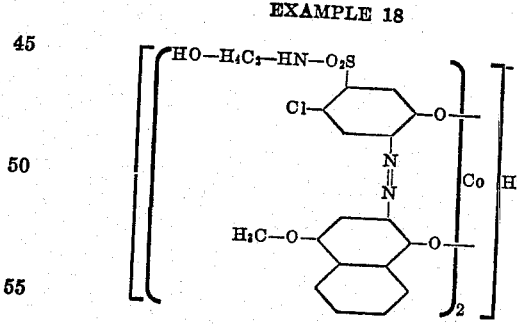

Having thus disclosed the invention what is claimed is:

1. A metalliferous azo dyestuff which corresponds to the formula

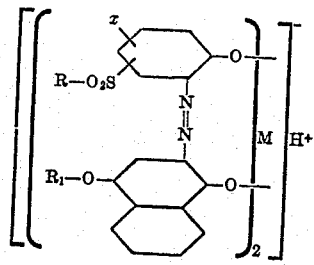

wherein $x$ represents a member selected from the group consisting of hydrogen, chlorine and methyl, R represents a member selected from the group consisting of a lower alkyl radical, an amino group, a lower alkylamino group, a di-(lower alkyl)-amino group, a lower hydroxyalkyl-amino group, a lower alkoxyalkyl-amino group, a mononuclear arylamino group, and the morpholyl group, $R_1$ represents a member selected from the group consisting of a lower alkyl radical and a lower alkoxyalkyl radical, and M represents a member selected from the group consisting of a chrominum and a cobalt atom.

2. The cobaltiferous azo dyestuff which corresponds to the formula

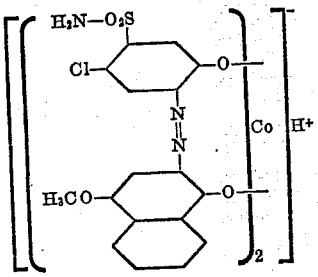

3. The cobaltiferous azo dyestuff which corresponds to the formula

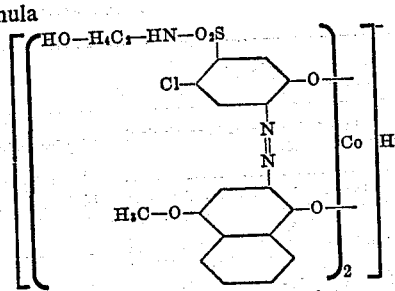

References Cited in the file of this patent

UNITED STATES PATENTS

| | | |
|---|---|---|
| 2,778,816 | Buehler et al. | Jan. 22, 1957 |
| 2,779,757 | Ruckstuhl et al. | Jan. 29, 1957 |
| 2,855,392 | Buehler et al. | Oct. 7, 1958 |

FOREIGN PATENTS

| | | |
|---|---|---|
| 305,631 | Switzerland | May 2, 1955 |

OTHER REFERENCES

Diserens: "The Chemical Technology of Dyeing and Printing," 1948, page 214.

Fierz-David and Blangley: "Fundamental Processes of Dye Chemistry," 1949, page 252.

UNITED STATES PATENT OFFICE

CERTIFICATION OF CORRECTION

Patent No. 2,936,304  May 10, 1960

Reinhard Neier et al.

It is hereby certified that error appears in the above numbered patent requiring correction and that the said Letters Patent should read as corrected below.

In the grant (only), line 1, name of second inventor, for "Walter Wehril" read -- Walter Wehrli --; in the printed specification, column 4, line 50, for "producetion" read -- production --; column 7, line 11, for "chrominum" read -- chromium --.

Signed and sealed this 9th day of May 1961.

(SEAL)
Attest:

ERNEST W. SWIDER
Attesting Officer

DAVID L. LADD
Commissioner of Patents